US012280519B2

(12) United States Patent
Smith et al.

(10) Patent No.: US 12,280,519 B2
(45) Date of Patent: Apr. 22, 2025

(54) LOG-SPLITTING MACHINE

(71) Applicant: Twister Machinery, LLC, Michigan City, IN (US)

(72) Inventors: Thomas Philip Smith, Michigan City, IN (US); Richard Martin Kessler, Peoria, AZ (US)

( * ) Notice: Subject to any disclaimer, the term of this patent is extended or adjusted under 35 U.S.C. 154(b) by 138 days.

(21) Appl. No.: 17/820,774

(22) Filed: Aug. 18, 2022

(65) Prior Publication Data

US 2023/0057237 A1 Feb. 23, 2023

Related U.S. Application Data

(60) Provisional application No. 63/234,589, filed on Aug. 18, 2021.

(51) Int. Cl.
*B27L 7/06* (2006.01)

(52) U.S. Cl.
CPC .................................... *B27L 7/06* (2013.01)

(58) Field of Classification Search
CPC .................................... B27L 7/02; B27L 7/04
See application file for complete search history.

(56) References Cited

U.S. PATENT DOCUMENTS

| | | | | |
|---|---|---|---|---|
| 3,242,955 A | | 3/1966 | Hestrom | |
| 4,091,851 A | | 5/1978 | Ober | |
| 4,116,251 A | | 9/1978 | Graney | |
| 4,188,987 A | | 2/1980 | James | |
| 4,245,683 A | * | 1/1981 | Cedergren | B27L 7/04 144/194 |
| 4,252,166 A | | 2/1981 | Kozicki | |
| 4,301,847 A | | 11/1981 | Stickler | |
| 4,315,534 A | | 2/1982 | Blackstone | |
| 4,335,762 A | * | 6/1982 | Reaume | B27L 7/04 144/194 |
| 4,418,731 A | * | 12/1983 | Smith | B27L 7/04 144/194 |
| 4,898,220 A | * | 2/1990 | Maingueneau | B27L 7/04 144/194 |
| 6,626,778 B1 | * | 9/2003 | Kapaan | F16H 63/067 474/20 |

FOREIGN PATENT DOCUMENTS

| | | |
|---|---|---|
| CN | 103692523 A | 4/2014 |
| CN | 104786334 A | 7/2015 |
| DE | 202013105941 U1 | 4/2014 |
| EP | 0830925 A1 | 9/1997 |

* cited by examiner

*Primary Examiner* — Matthew Katcoff
(74) *Attorney, Agent, or Firm* — Venjuris, P.C.; Richard E. Oney

(57) ABSTRACT

A log splitter includes a chassis having a support table configured to support a log to be split, a splitter screw having a generally conical shape and mounted to a rotatable screw shaft that is supported by the chassis, and a drive assembly configured to rotate the shaft to impart rotational movement to the splitter screw about a screw axis. The drive assembly includes a motor coupled to the screw shaft via a constant velocity transmission (CVT) (also known as continuously variable transmission). The CVT can provide both high speed and high torque during the splitting process as required to split the log. A fall restriction bar helps restrict a person from accidentally falling onto the splitter screw. An engine-kill bar is pivotally mounted to the chassis. A log-rotation stop mechanism is configured to restrict rotation of a log that gets stuck on the splitter screw.

18 Claims, 22 Drawing Sheets

LOG-SPLITTING MACHINE

RELATED APPLICATION

This application claims the benefit of U.S. provisional patent application Ser. No. 63/234,589, filed Aug. 18, 2021, entitled "Log-splitting Machine," which is hereby incorporated by reference into this application in its entirety as if fully set forth herein.

BACKGROUND

The present invention relates to apparatus for splitting logs and, more particularly, to an improved portable log splitting apparatus of the type employing a rotatable, threaded, screw-shaped wedge for safely, easily and rapidly splitting logs and log portions.

Power-driven rotatable-wedge log splitting apparatus have been sold commercially for some time. One type of such an apparatus is mounted to a vehicle. This system is faster than ram/wedge log splitters and can split difficult logs, including those of unusual size. The system, however, has a number of drawbacks. The system requires a dedicated vehicle with lengthy setup. It is neither fuel efficient, nor compact. Moreover, the engine kill feature is easily bypassed and incompatible with many modern vehicles.

It is an object of the present invention to provide a log splitter that has the advantages of using a rotating screw wedge but that also is portable, fuel efficient, relatively small and light, and includes an integrated drive unit.

It is another object of the present invention to provide such a log splitter that can be powered by a relatively small motor and still provide both high speed and high torque as required at various times during the process of splitting logs.

It is still another object of the invention to provide such a log splitter that has enhanced safety features, which can include an engine kill mechanism that is readily accessible and convenient to use.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, there is provided an improved screw-type log splitter that maximizes efficiency with portability. The log splitter includes a chassis having a support table configured to support a workpiece (such as a log) to be split. A splitter screw having a generally conical shape is mounted to a rotatable screw shaft that is supported by the chassis above the support table, and a drive assembly is configured to rotate the shaft to impart rotational movement to the splitter screw about a screw axis. In some embodiments, the drive assembly includes a motor coupled to the screw shaft via a constant velocity transmission (CVT) (also known as a continuously variable transmission). The CVT can provide both high speed and high torque during the splitting process as required to split the log. The drive assembly can also include a reduction gear set that couples the constant velocity transmission to the screw shaft. This can include a drive sprocket mounted to an output shaft of the constant velocity transmission, a driven sprocket mounted to the screw shaft, and a drive chain that couples the drive sprocket to the driven sprocket. The drive assembly can be configured to rotate the screw shaft at a rotational velocity in a range from about 250 revolutions per minute to about 600 revolutions per minute.

In some embodiments of the invention, the support table has a table top generally disposed in a plane that forms an acute angle with the lower surface of the screw, which feature protects the screw and screw shaft from overload. In some exemplary embodiments, the acute angle is approximately 0.05 degree. Preferably, the support table is generally disposed in a plane that is low to the ground, such as approximately nine inches above the ground.

In some embodiments of the invention, a fall restriction member is disposed above at least a portion of the screw shaft, and the fall restriction member is configured to restrict a person from accidentally falling onto the splitter screw. The fall restriction member can include a bar member mounted to the chassis and disposed generally laterally to the screw shaft. In some embodiments, the log splitter can include an engine kill mechanism that includes an elongated member, such as a bar, disposed generally above and laterally to the splitter screw. The elongated member can be pivotally mounted to the chassis so that when the elongated member is pivoted downward, it activates the engine kill switch.

In some embodiments, the support table and splitter screw are dimensioned and disposed so that the clearance between the table top plane and the lower surface of the splitter screw generally increases from a screw distal end to a screw proximal end.

In some embodiments, the log-splitting machine can include a log-rotation stop mechanism coupled to the support table and configured so that, if a workpiece gets stuck on the splitter screw as the splitter screw rotates, the log-rotation stop mechanism will restrict rotation of the workpiece. In some embodiments, the log-rotation stop mechanism includes movable stop plate configured so that, if a workpiece gets stuck on the splitter screw as the splitter screw rotates, the stop plate will move to a position where it projects above the support table as the workpiece rotates.

A log splitter in accordance with the invention, provides a number of advantages over the prior art. It has the advantage of using a rotating screw wedge but also is portable, efficient, relatively small and light, and includes an integrated drive assembly. It can be powered by a relatively small motor and still provide both high speed and high torque as required at various times during the process of splitting logs. It provides enhanced safety features, which can restrict a person from accidentally falling onto the splitter screw and can include an engine kill mechanism that is readily accessible and convenient to use. In addition, the low working table height can reduce user strain.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred methods and embodiments given below, serve to explain the principles of the invention.

DETAILED DESCRIPTION

Reference will now be made in more detail to presently preferred embodiments of the invention, as illustrated in the accompanying drawings. While the invention is described more fully with reference to these examples and drawings, the invention in its broader aspects is not limited to the specific details, representative devices, and illustrative examples shown and described. Rather, the description, which follows is to be understood as a broad, teaching disclosure directed to persons of ordinary skill in the appropriate arts, and not as limiting upon the invention.

It will be appreciated that terms such as “forward,” “rearward,” “upper,” “inner,” “outer,” “vertical,” “horizontal,” “bottom,” “below,” “top,” “above,” “side,” “inwardly,” “outwardly,” “downwardly” and “lower” and other positional descriptive terms used in this specification are used merely for ease of description and refer to the orientation of the referenced components as shown in the figures. It should be understood that any orientation of the components described herein is within the scope of the present invention.

Figure 8:
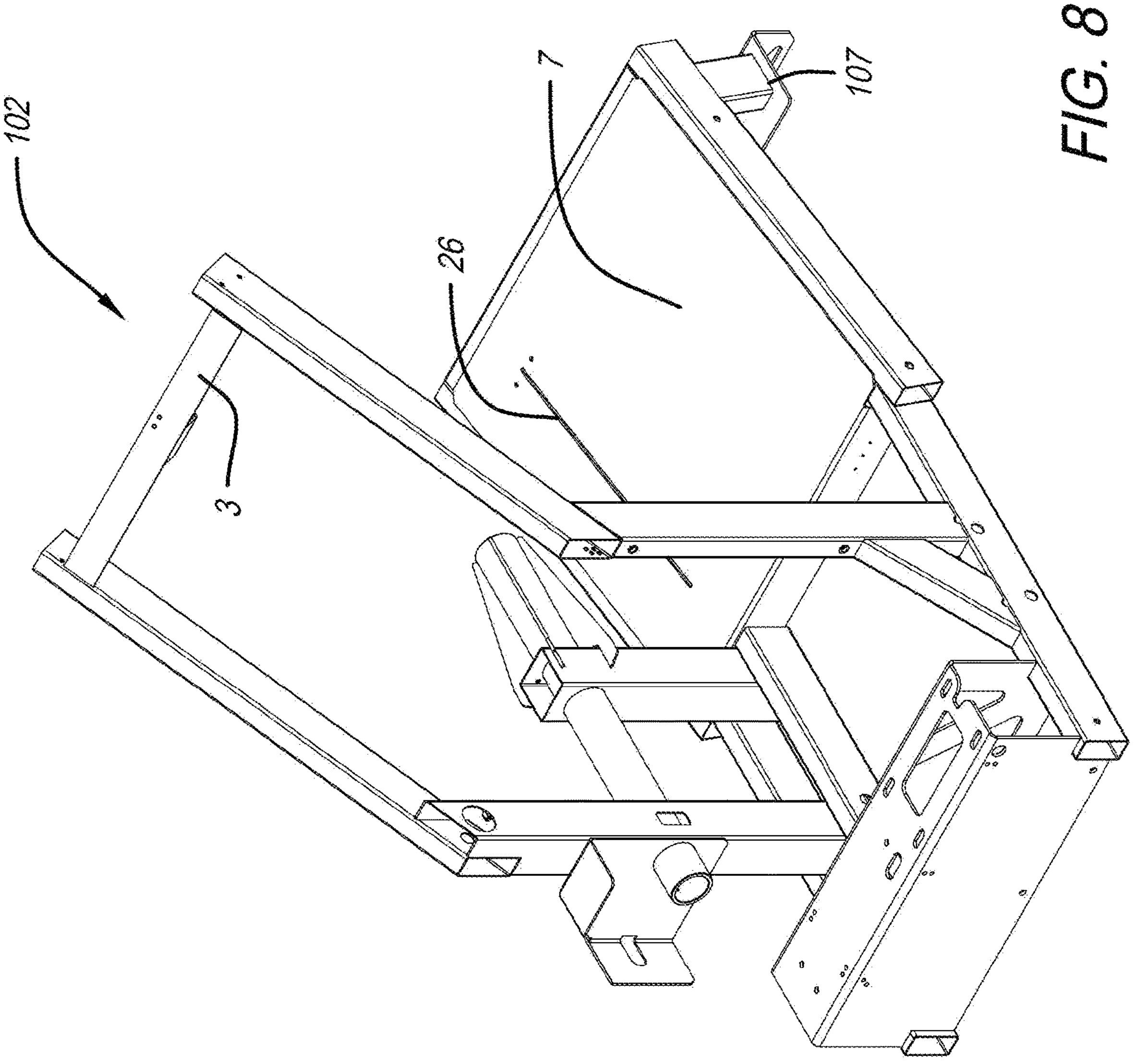
FIG. 8 is a top rear perspective view of the chassis of the log-splitting machine of FIG. 1.
Figure 9:
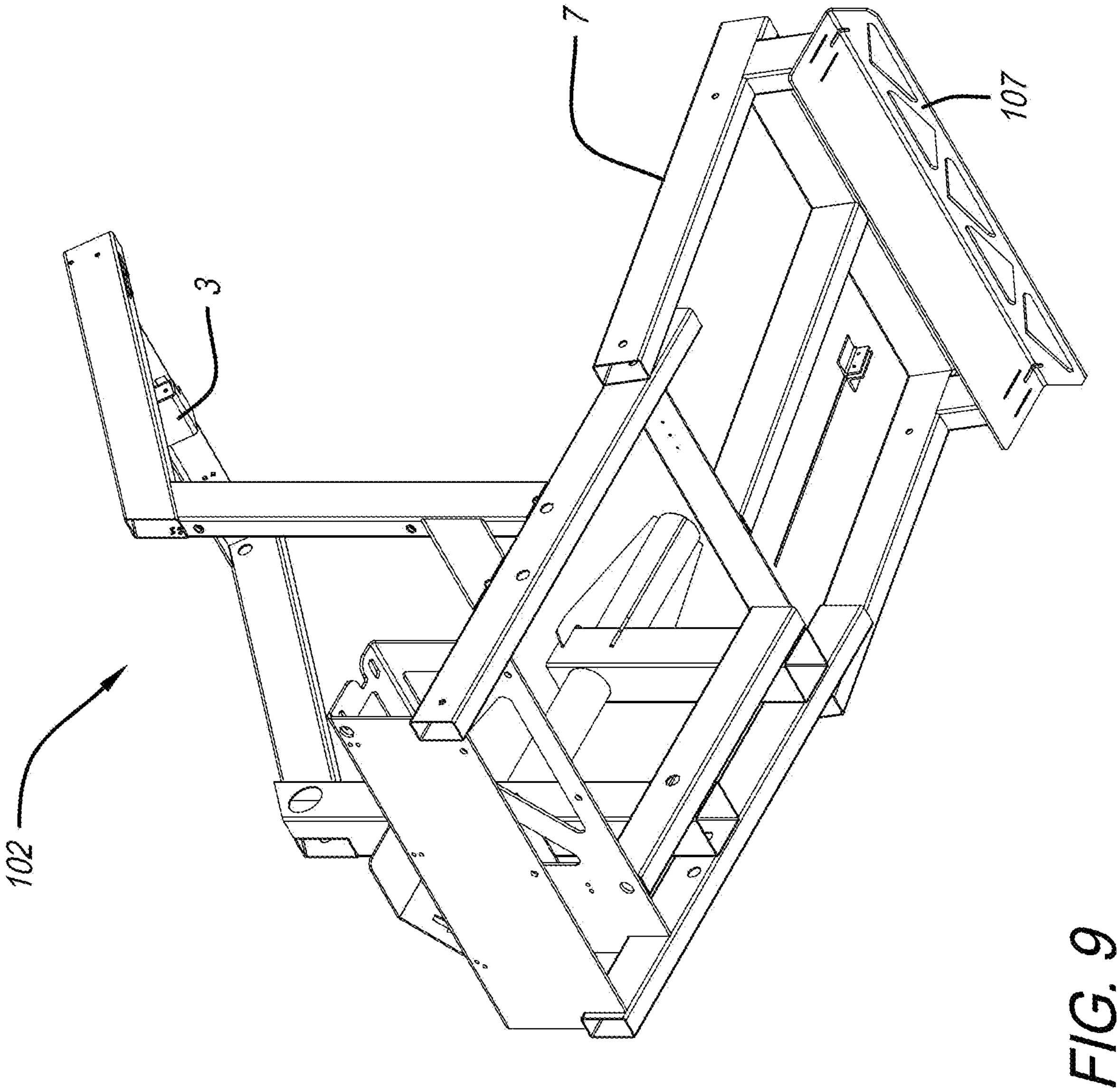
FIG. 9 is a bottom rear perspective view of the chassis of the log-splitting machine of FIG. 1.
Figure 10:
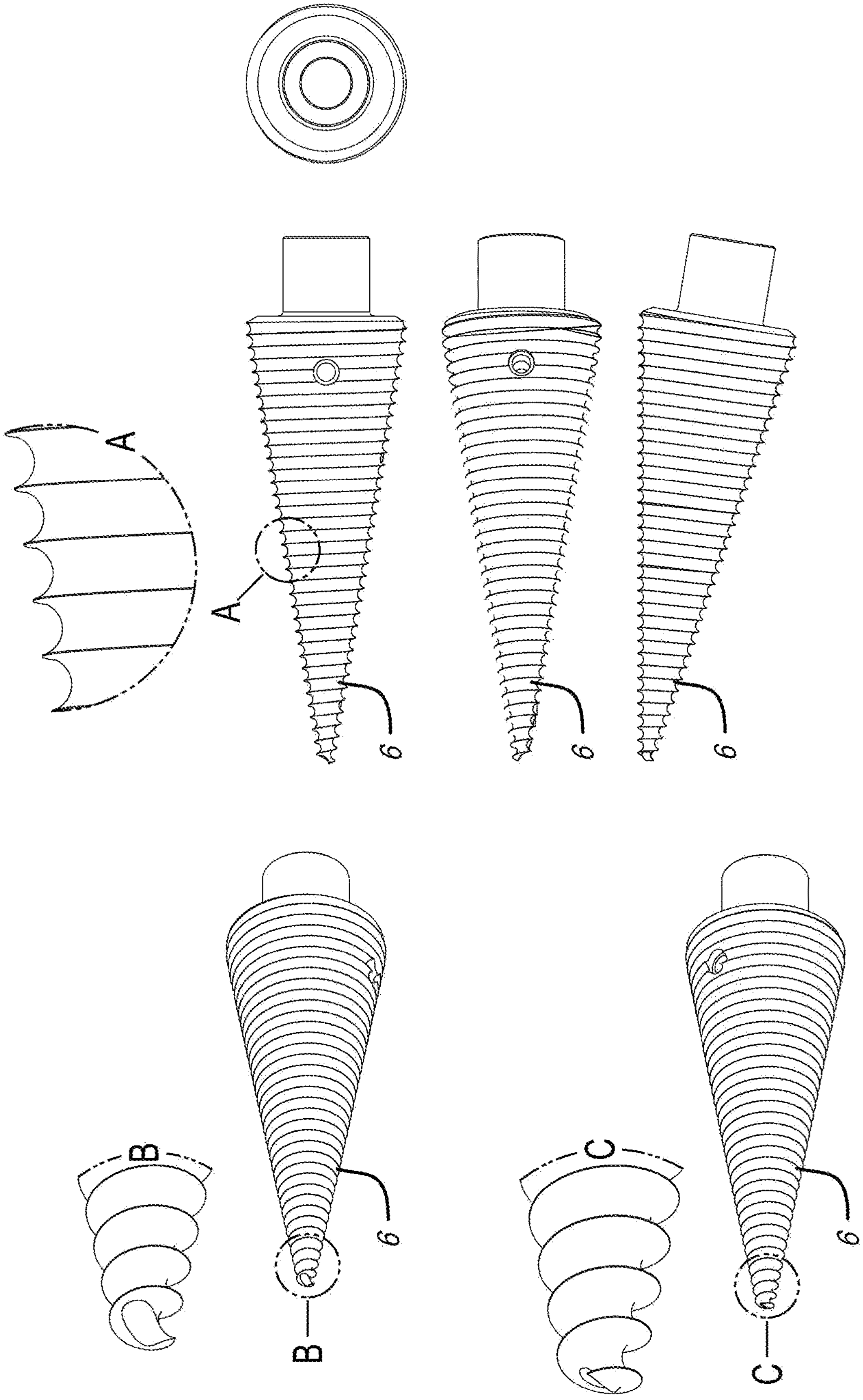
FIG. 10 includes a side elevation view and a rear elevation view of the splitter screw of the log-splitting machine of FIG. 1.
Figure 11:
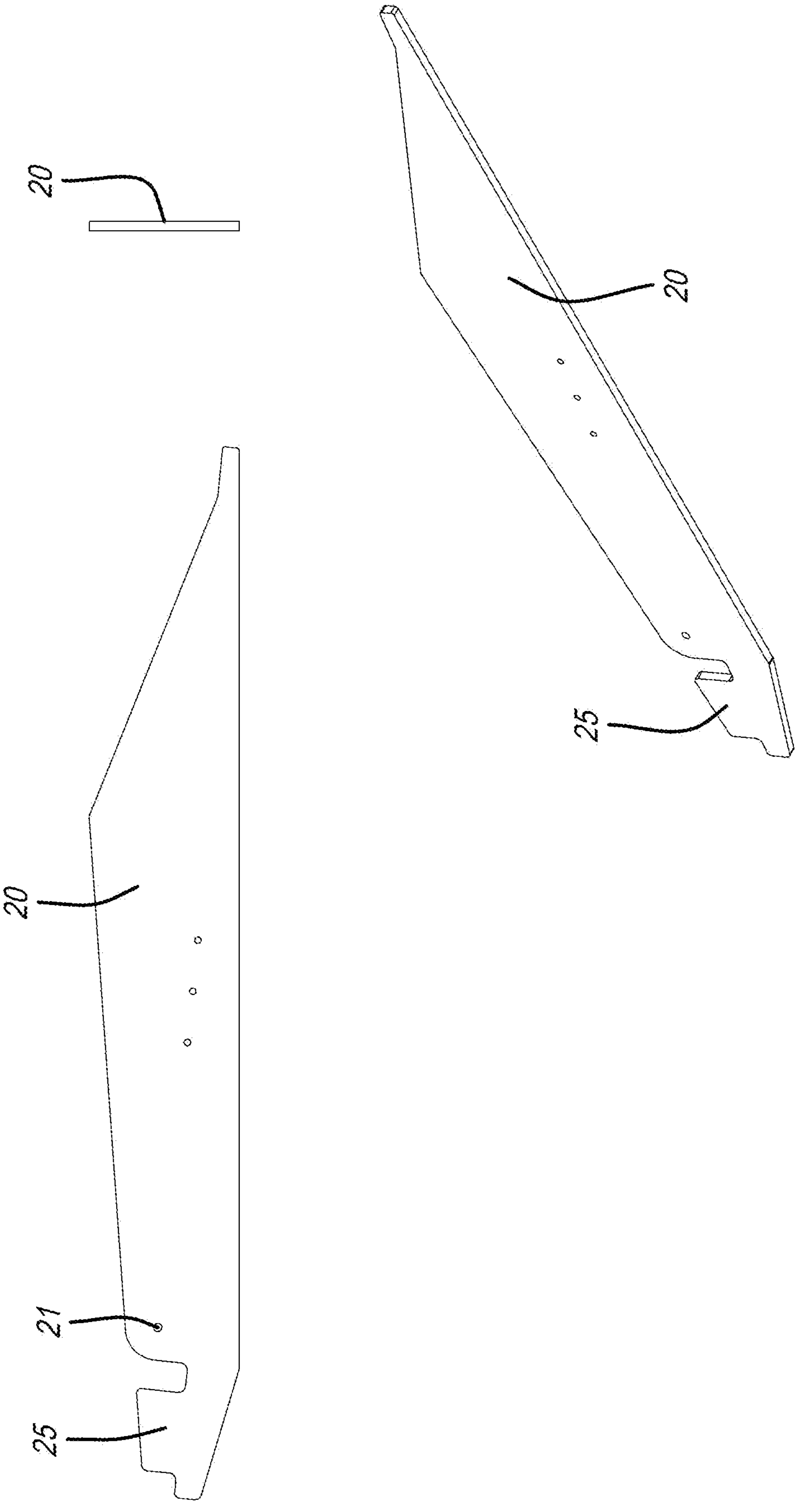
FIG. 11 includes a side elevation view and rear elevation view of the stop plate (or cleaver) of the log-rotation stop mechanism of the log-splitting machine of FIG. 1.

FIGS. 1-7 illustrate one embodiment of a portable log-splitting machine according to the present invention, generally designated as 100. The log-splitting machine 100 includes a chassis 102 (also shown in FIGS. 8-9), which supports a splitter screw 6 and a drive assembly 104. The chassis 102 is supported by support members including a set of support wheels 106 at the rearward (or proximal) portion of the chassis 102 and a spade support 107 at the forward (or distal) portion of the chassis 102. The splitter screw 6 has a generally conical shape and is mounted to a screw shaft 108 that is supported by the chassis 102 and is rotatable about a screw axis S (shown in FIGS. 3A and 3B).

Still referring to FIGS. 1-7, the drive assembly 104 is configured to rotate the screw shaft 108 to impart rotational movement to the screw 6. In the embodiment shown, the drive assembly 104 includes a motor 110 coupled to the screw shaft 108 via a CVT 10 for rotating the screw shaft 108 and screw 6. Also in the embodiment shown, the motor 110 is an internal combustion engine with a keyed ignition switch 2 for turning the motor 110 on and off. It will be understood, however, that the motor need not be limited to an internal combustion engine but could also be, for example, an appropriate electric or hydraulic motor. The chassis 102 includes a support table 7 for supporting a workpiece to be split, such as a log 11, 12 (see FIGS. 6 and 7). A log-rotation stop assembly 4 mounted to the support table 7 restricts uncontrolled log rotation in the event the workpiece 11, 12 pulls away from the support table 7 during splitting, such as if the workpiece 11, 12 gets stuck to the splitter screw 6 during rotation of the screw.

Figure 15A:
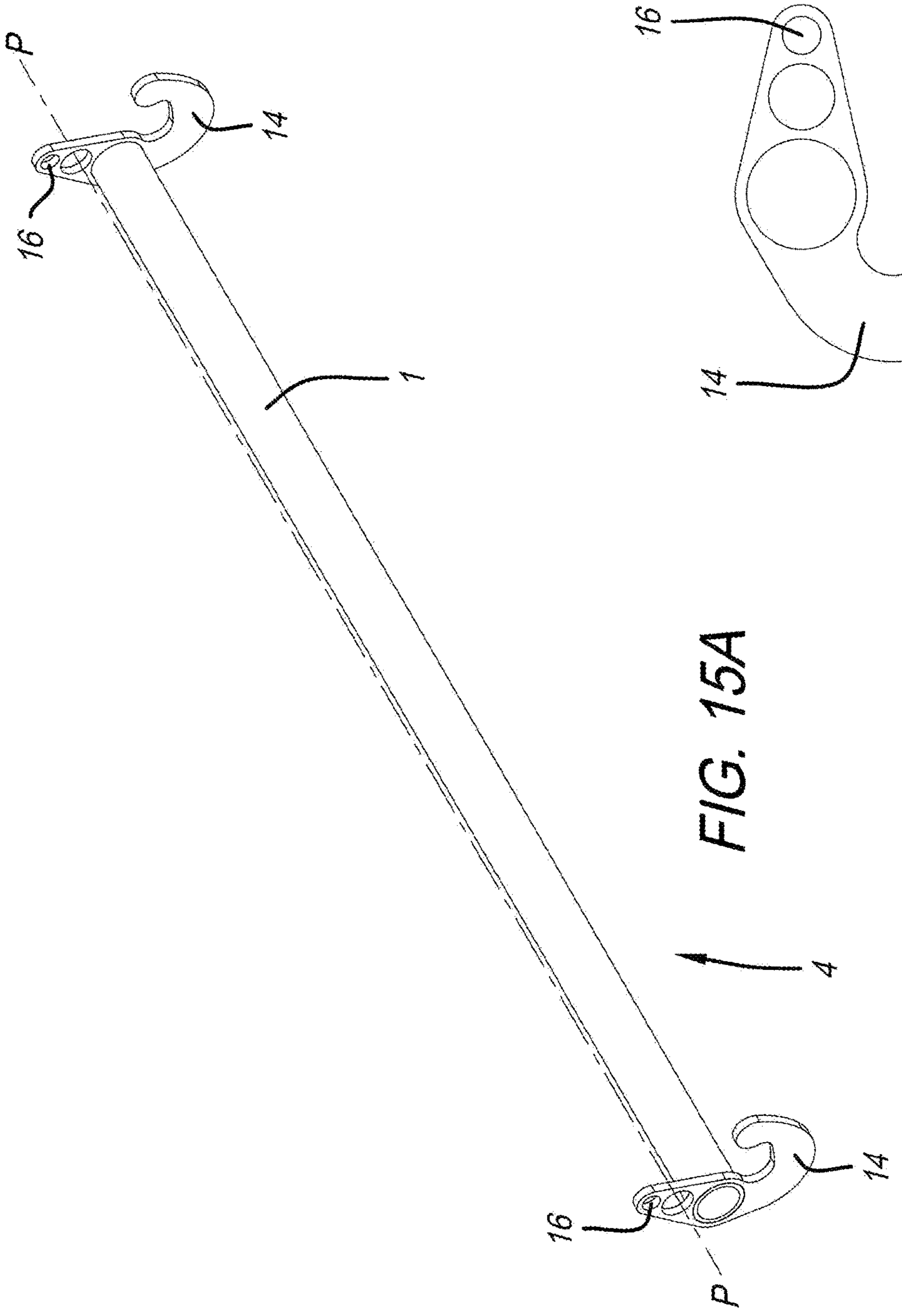
FIG. 15A is a perspective view of an engine kill bar of the log-splitting machine of FIG. 1, showing pivot arms mounted to the ends of the bar.
Figure 15B:
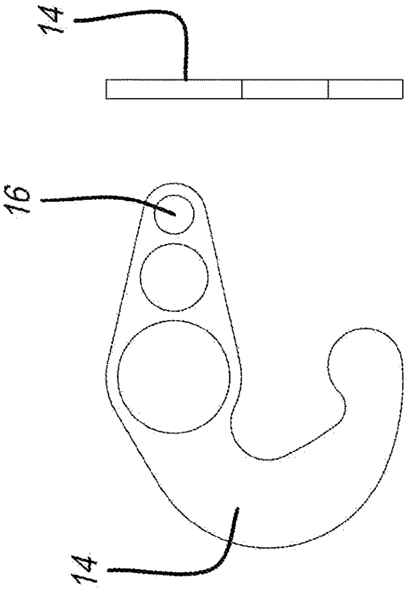
FIG. 15B includes a side elevation view and a top plan view of a pivot arm of the engine kill bar of FIG. 15A.
Figure 16:
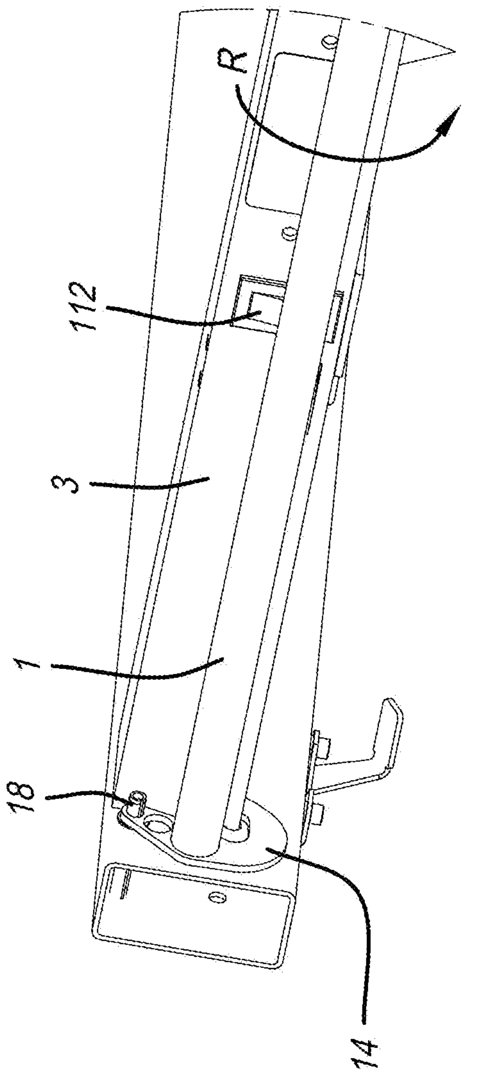
FIG. 16 is a perspective view showing a portion of the engine kill mechanism of the log-splitting machine of FIG. 1, showing the engine kill bar pivotally mounted to the chassis.

Referring to FIGS. 1-9, the chassis 102 includes a lateral fall bar 3 disposed above the screw axis S, which helps restrict a person from accidentally falling onto the splitter screw 6. An engine kill mechanism 5 includes an engine kill bar 1 mounted to the chassis 102 parallel to and in front of the fall bar 3. Also referring to FIGS. 15-16, the engine kill bar 1 is rotatable in a rearward rotation direction R about a pivot axis P. At each end of the engine kill bar 1 is a pivot arm 14, which includes a pivot pin hole 16 for receiving a pivot pin 18 to pivotally mount the pivot arm 14 to the chassis 102 in front of the fall bar 3. When a downward or rearward force is applied to the engine kill bar 1, it pivots rearward into contact with a toggle switch 112, which is mounted to the fall bar 3 and is wired to the engine ignition switch to cut off the engine when the toggle switch 112 is contacted by the engine kill bar 1.

Figure 1:
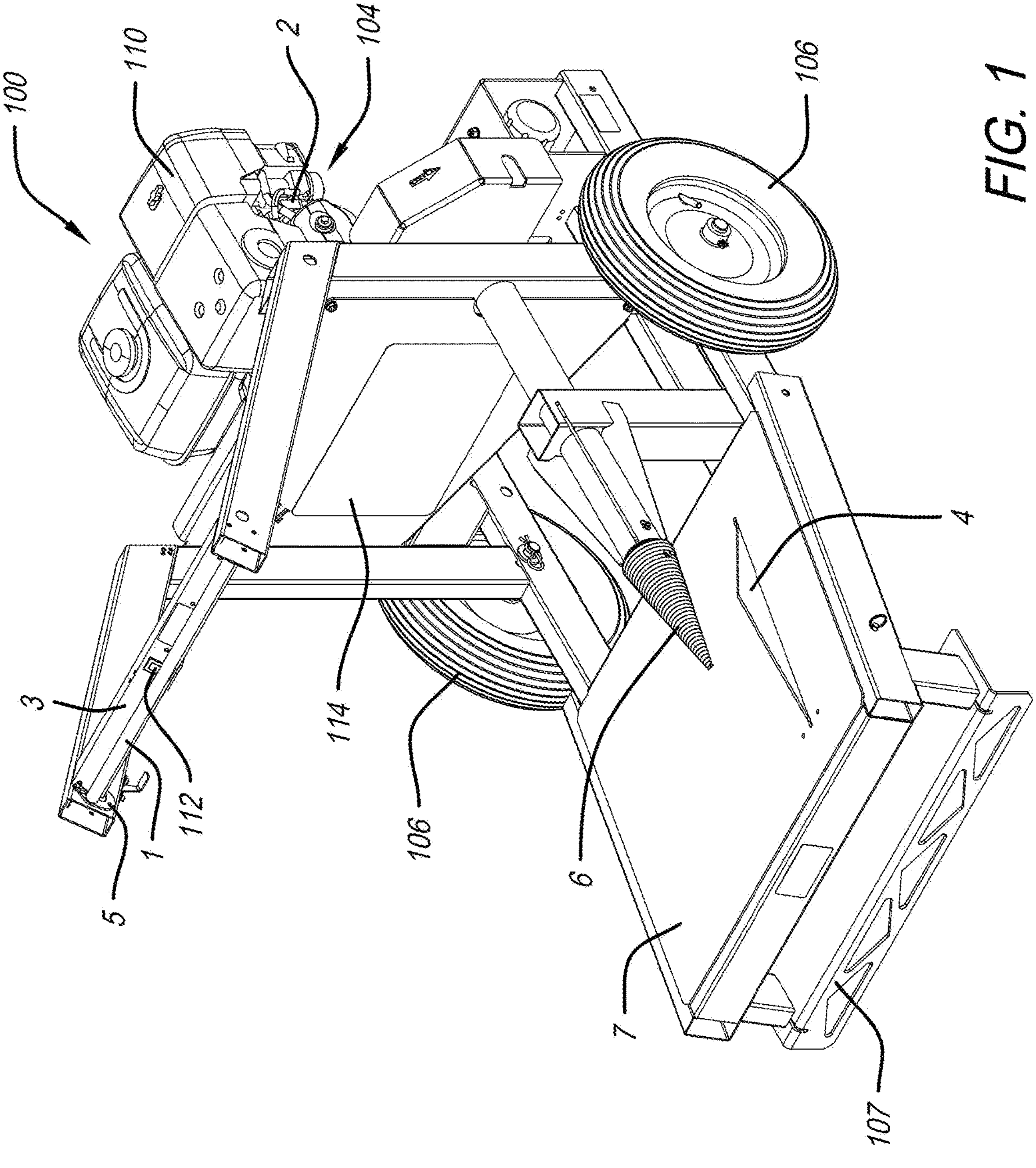
FIG. 1 is a right side perspective view of one embodiment of a log-splitting machine according to the present invention.
Figure 2:
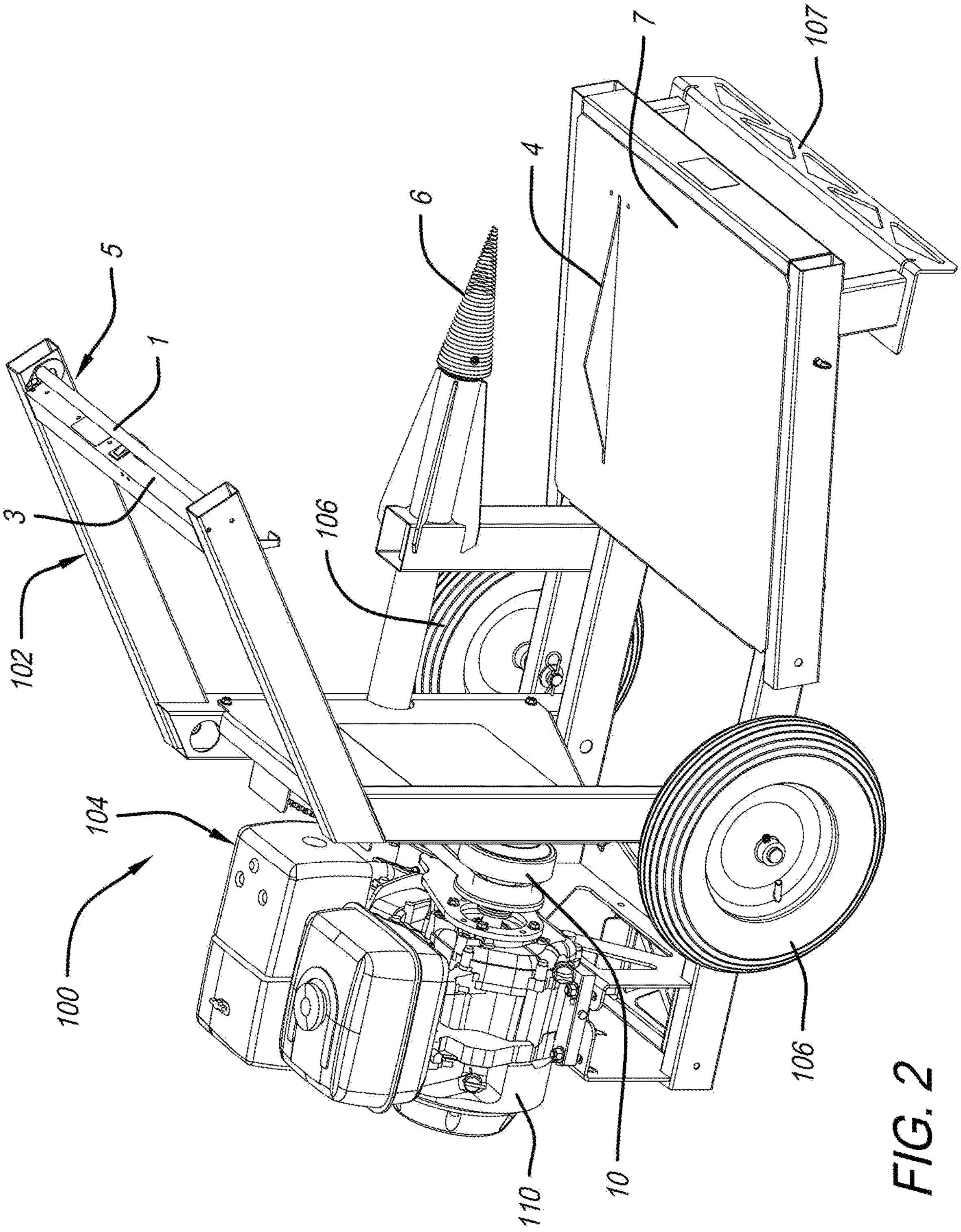
FIG. 2 is a left side perspective view of the log-splitting machine of FIG. 1.
Figure 3A:
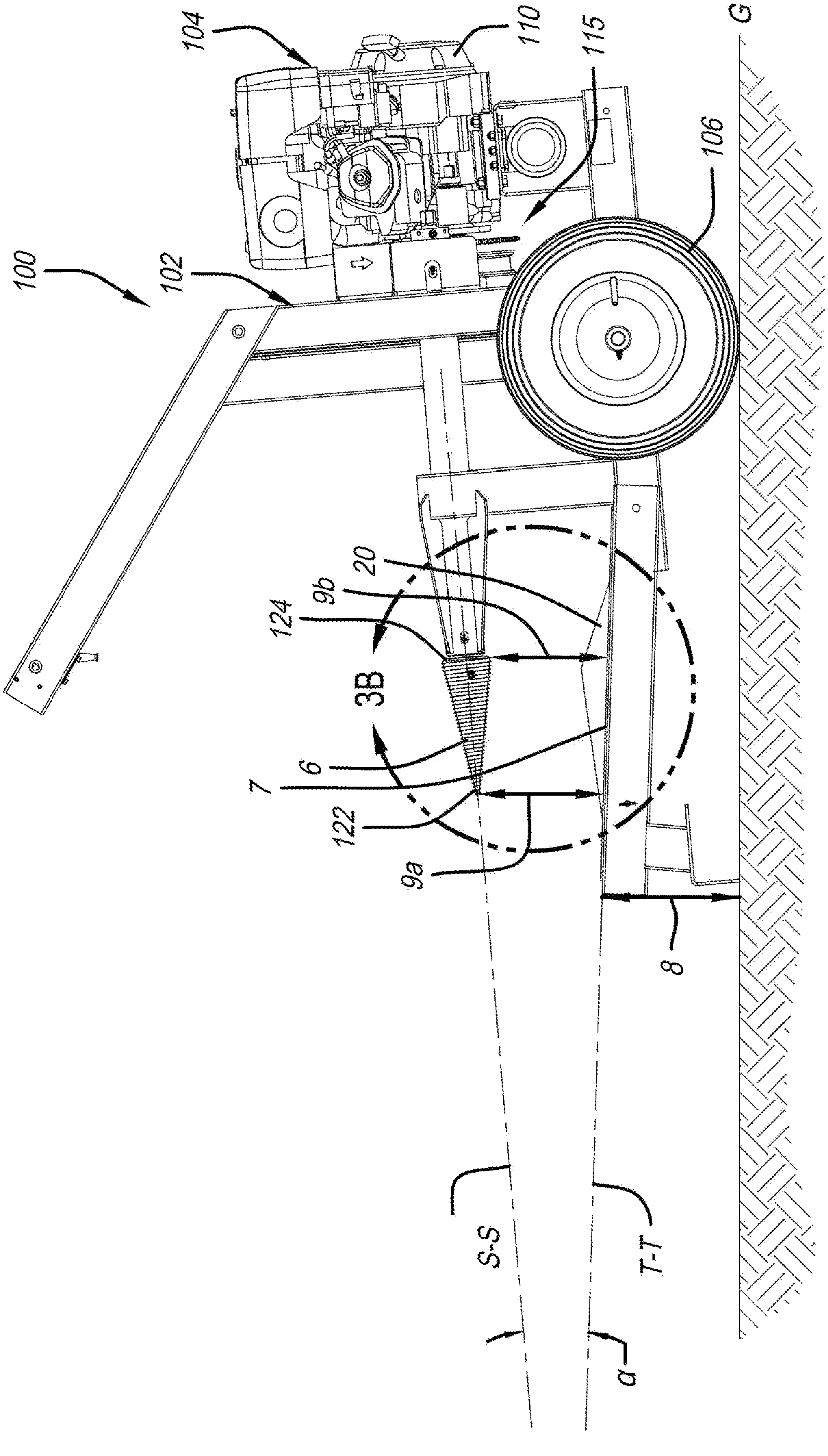
FIG. 3A is a right side elevation view of the log-splitting machine of FIG. 1.
Figure 3B:
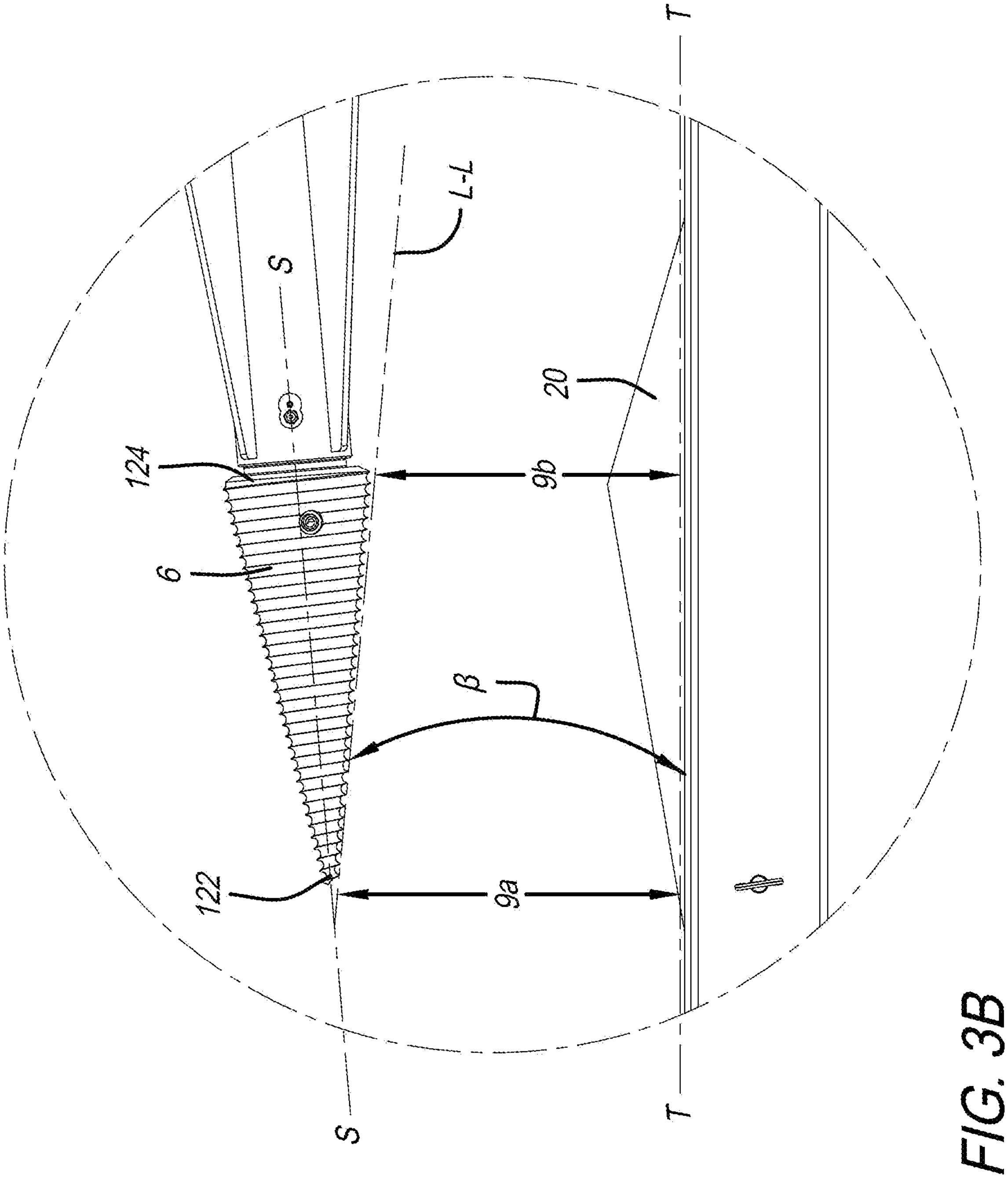
FIG. 3B is an enlarged view of a portion of FIG. 3A, showing the spacial relationship between the splitter screw and the table top.
Figure 4:
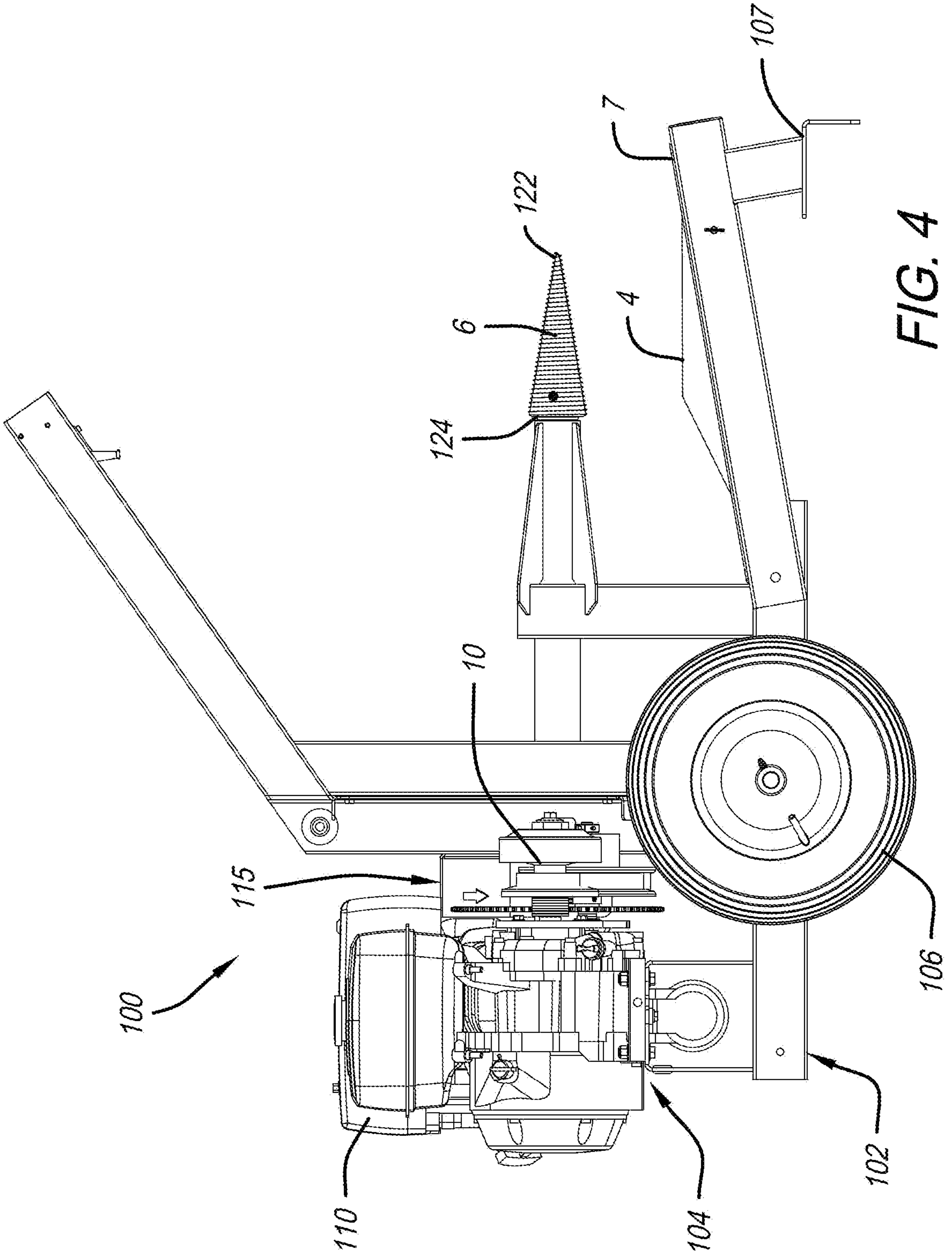
FIG. 4 is a left side elevation view of the log-splitting machine of FIG. 1.
Figure 5:
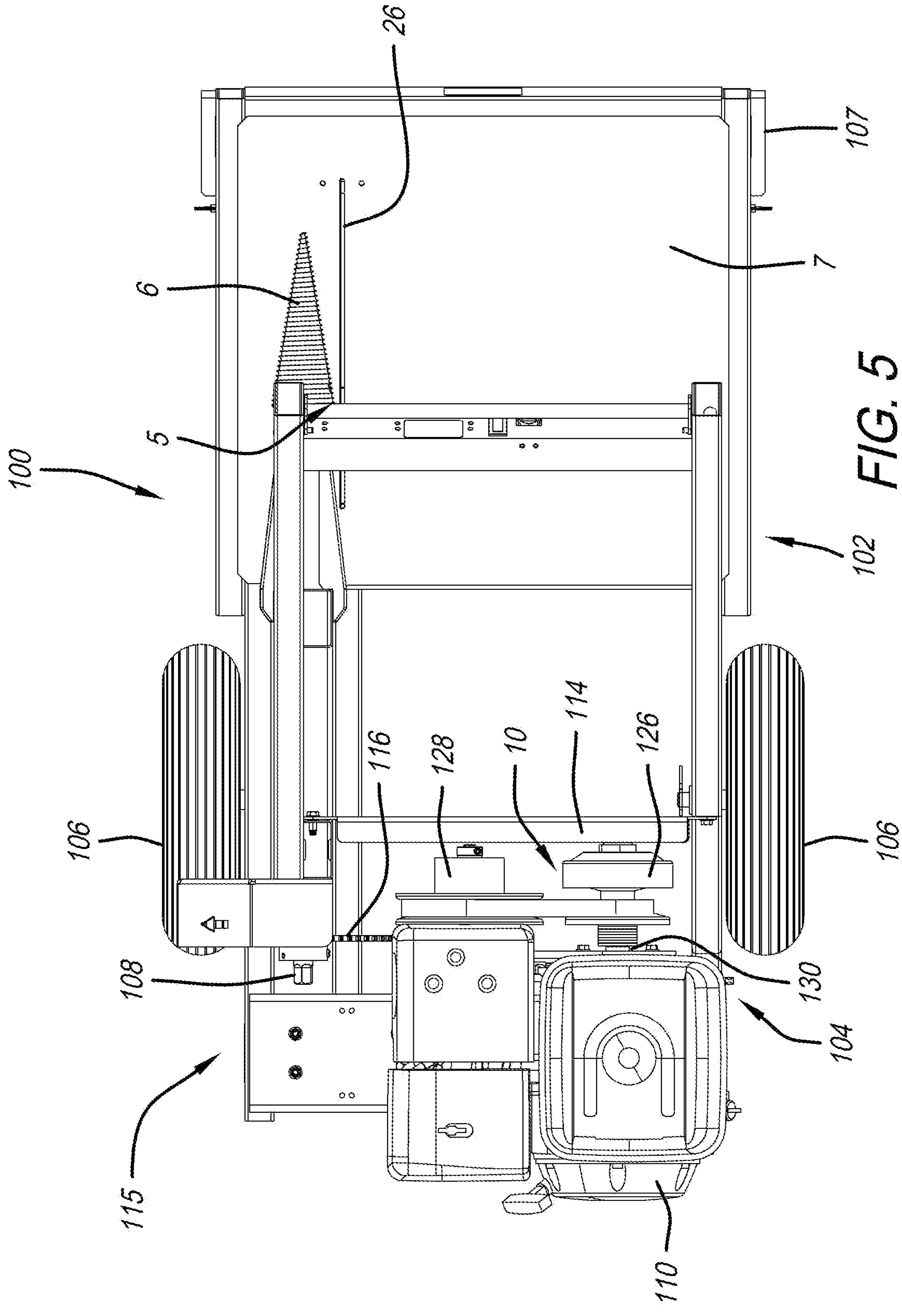
FIG. 5 is a top plan view of the log-splitting machine of FIG. 1.
Figure 6:
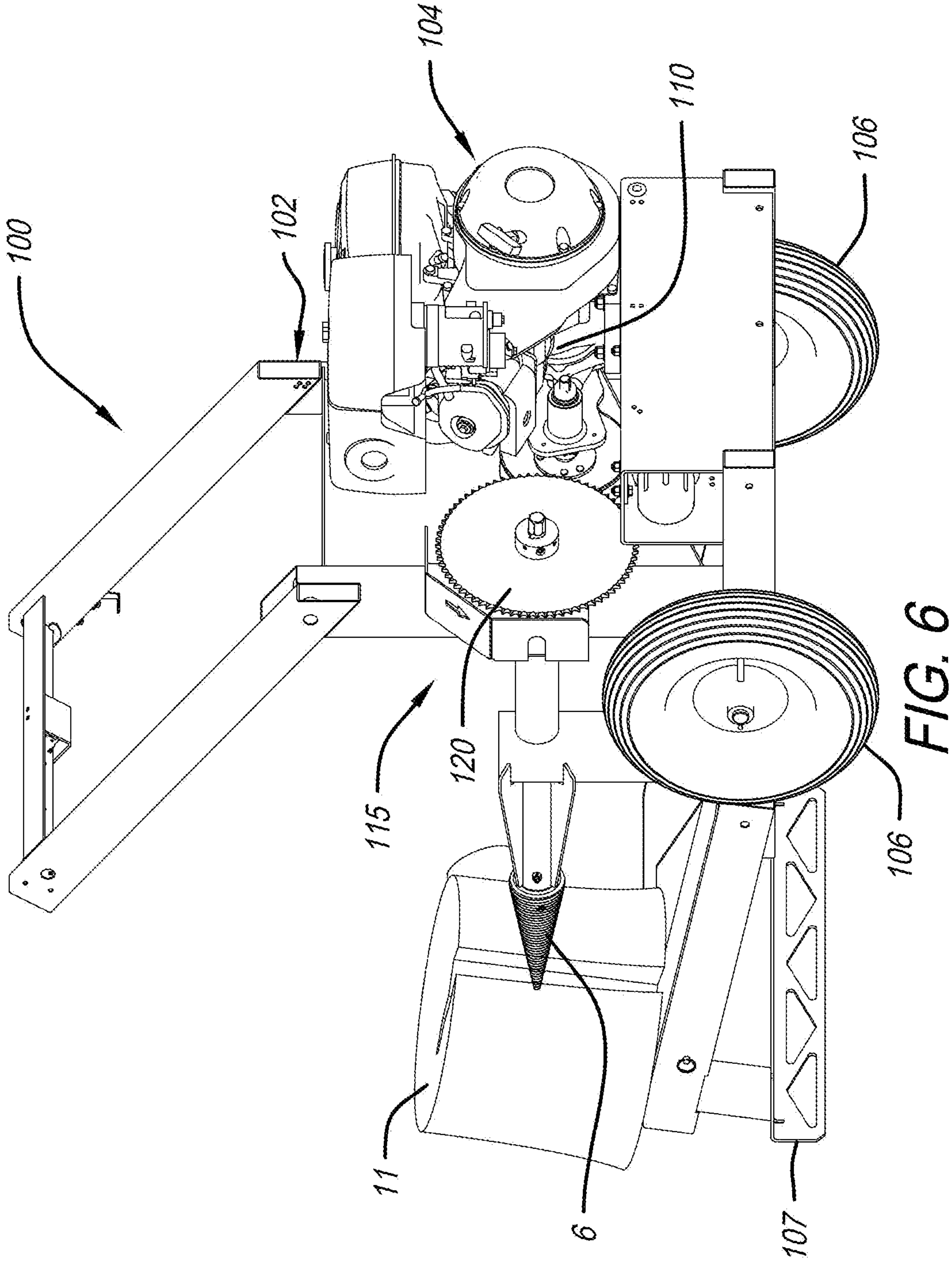
FIG. 6 is a rear perspective view of the log-splitting machine of FIG. 1 illustrating how it is used to split a workpiece that is a large diameter, short length log.
Figure 7:
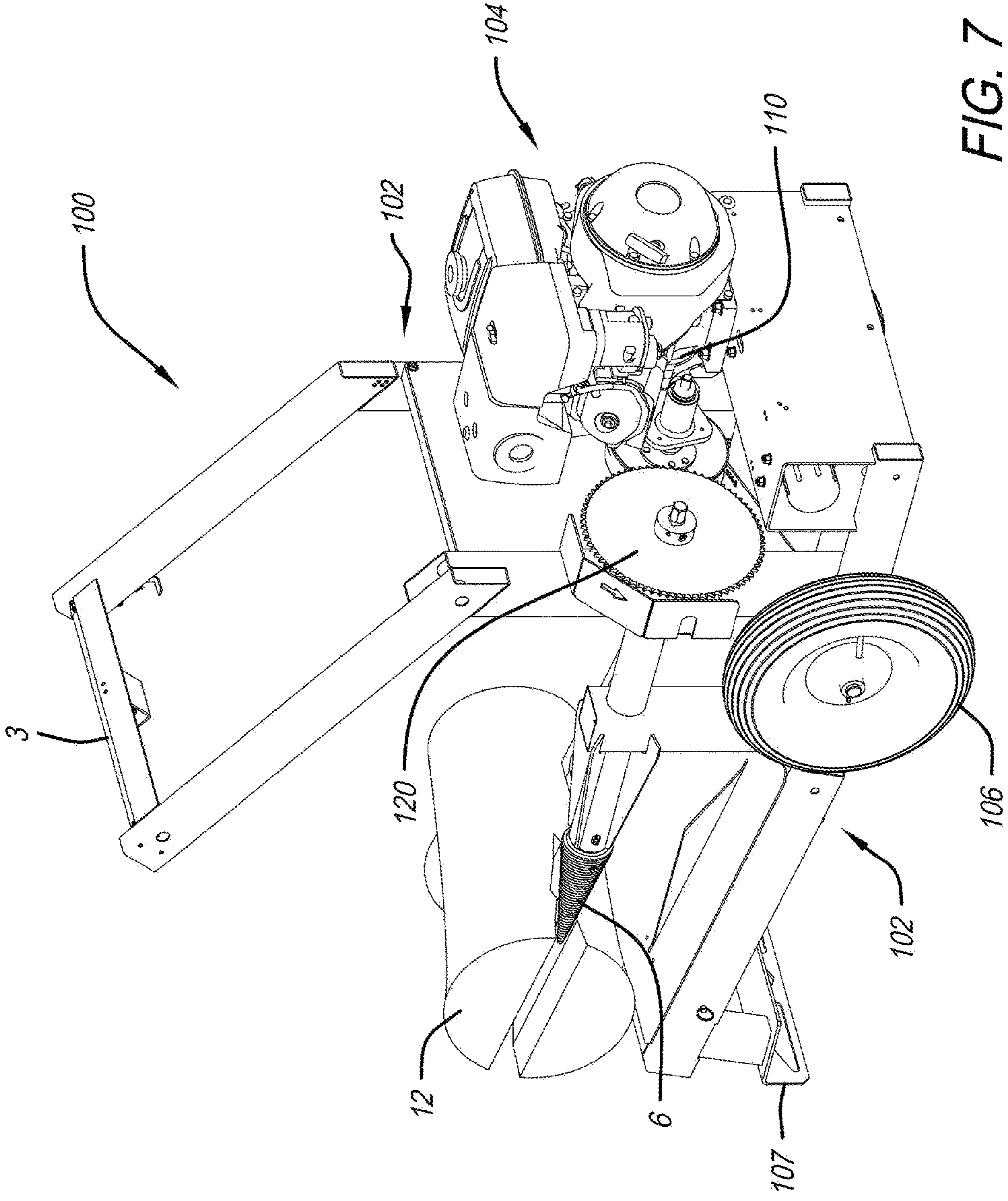
FIG. 7 is a rear perspective view of the log-splitting machine of FIG. 1 illustrating how it is used to split a workpiece that is a small diameter, long length log.

As can be seen in FIGS. 3A and 3B, the support table 7 has a top surface generally disposed in a plane T-T, which plane forms an acute angle α with the screw axis S-S. Also, as shown in FIGS. 3A and 3B, the table 7 and screw 6 also are dimensioned and positioned so that the screw lower surface (shown in FIG. 3B as being disposed in a screw lower plane L-L), forms an acute angle β with the table top plane T-T. By way of example, in the embodiment shown in FIGS. 3A and 3B, the acute angle α is about 10 degrees and the acute angle β is about 0.5 degree. In this configuration, moving along the table 7 rearward toward the drive unit 104, the clearance 9*a*, 9*b* between the screw lower plane L-L and the table top plane T-T increases. Consequently, the workpiece has more clearance as it advances onto the screw 6. For example, in the embodiment shown in FIGS. 3A and 3B, at the distal tip 122 of the screw 6 the clearance 9*a* from the bottom plane L-L of the splitter screw 6 to the table 7 is about 7 inches and at the opposite, proximal end 124 of the splitter screw 6 the clearance 9*b* from the bottom plane L-L of the splitter screw 6 to the table 7 is about 7.1 inches. This configuration advantageously reduces loading of the screw 6 and screw shaft 108 as the screw 6 penetrates a log. If the log jams between the splitter screw 6 and the table 7 during the splitting process, the likelihood that the screw 6 and screw shaft 108 will be bent or damaged is reduced.

Also as shown in FIGS. 3A and 3B, the support table 7 is disposed relatively low to the ground G upon which the log-splitting machine 100 rests. For example, in some embodiments, the support table 7 is generally disposed at a height 8 of approximately nine inches above the ground G. This low table height reduces strain on a user's back while lifting logs onto the table 7.

Referring again to FIGS. 1-9, the drive assembly 104 is mounted on the chassis 102 rearward of a guard panel 114. The motor 110 is rotatably coupled to the screw shaft 108 via the CVT 10. A CVT is a transmission having a speed ratio that can be varied continuously over its allowable range. Its speed ratio can take on any value within this range, i.e., an infinite number of ratios within the range are possible. This contrasts with a gearbox transmission, which has a discrete number of fixed speed ratios. The flexibility of a CVT allows the CVT input shaft (e.g., the crankshaft of the motor) to maintain a constant angular velocity. By utilizing a CVT, the log splitter of the present invention can maximize splitting speed while retaining strength in the form of torque. Initially as the log splitting begins, speed is required, while high torque is not required. As the splitting operation progresses, however, more torque is required. The CVT adjusts to both of these situations.

Figure 17:
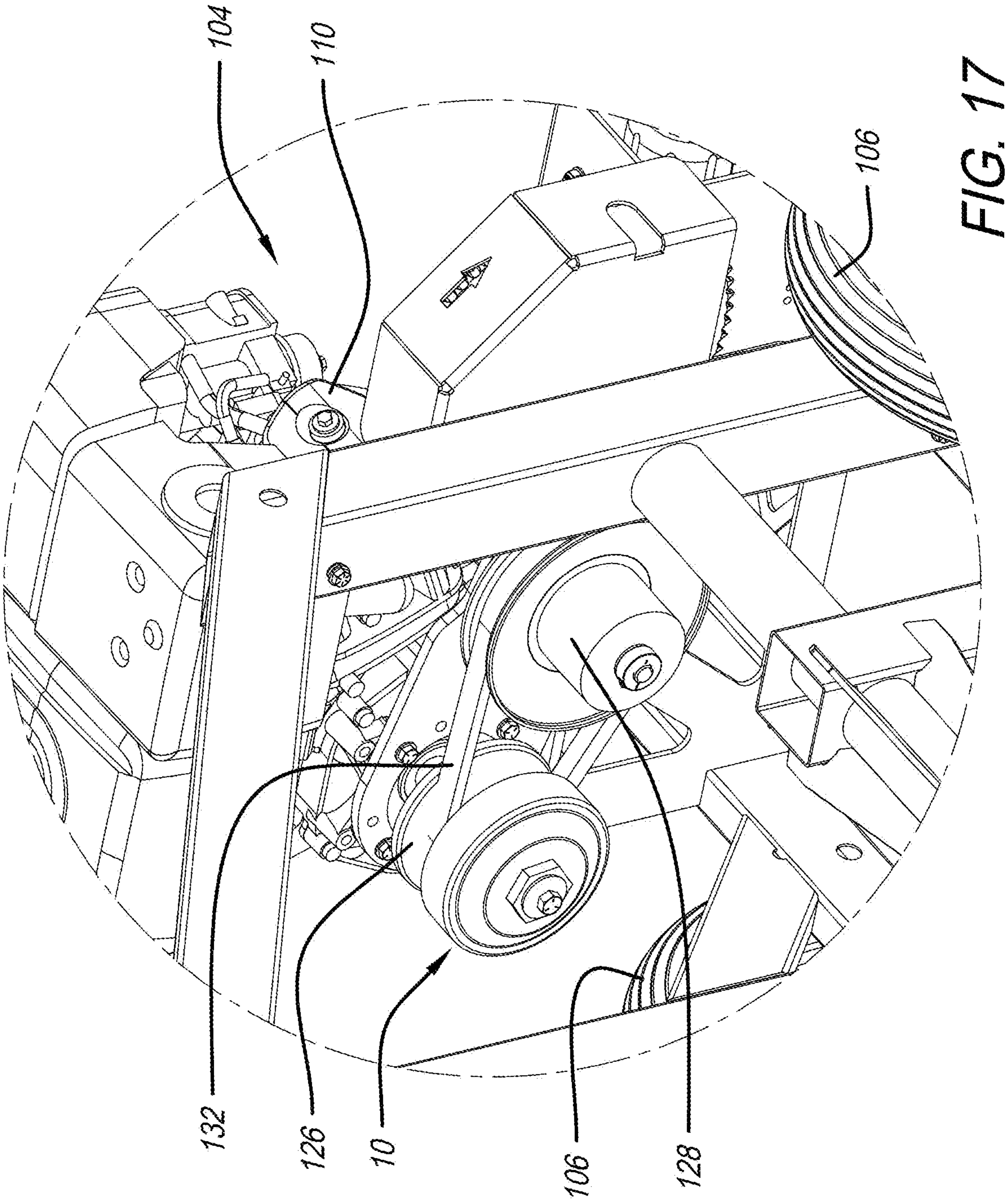
FIG. 17 is a front perspective view of a portion of the log-splitting machine of FIG. 1 with the guard plate removed to show the drive assembly.
Figure 18:
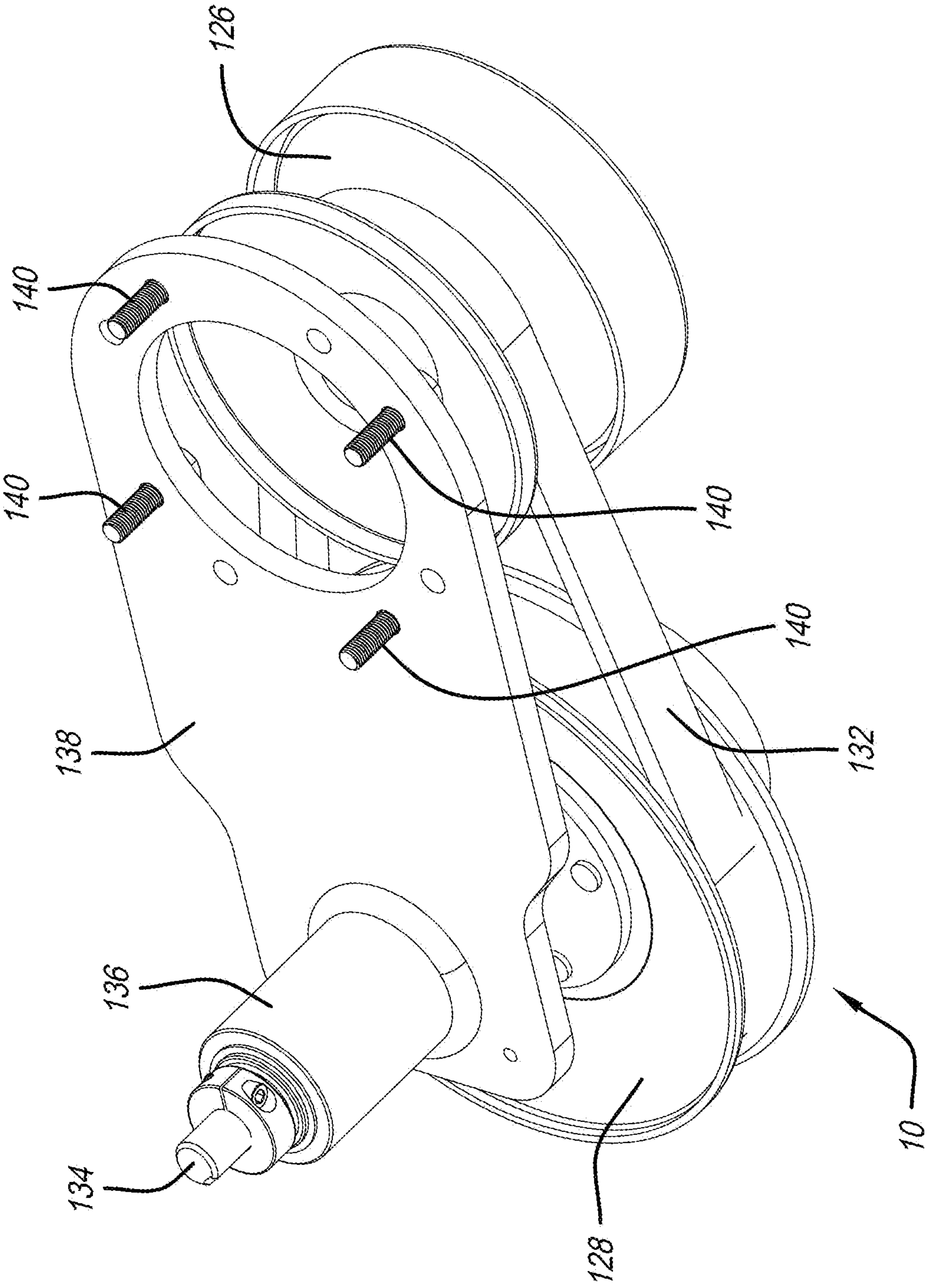
FIG. 18 is a rear perspective view of the CVT of the log-splitting machine of FIG. 1.
Figure 19:
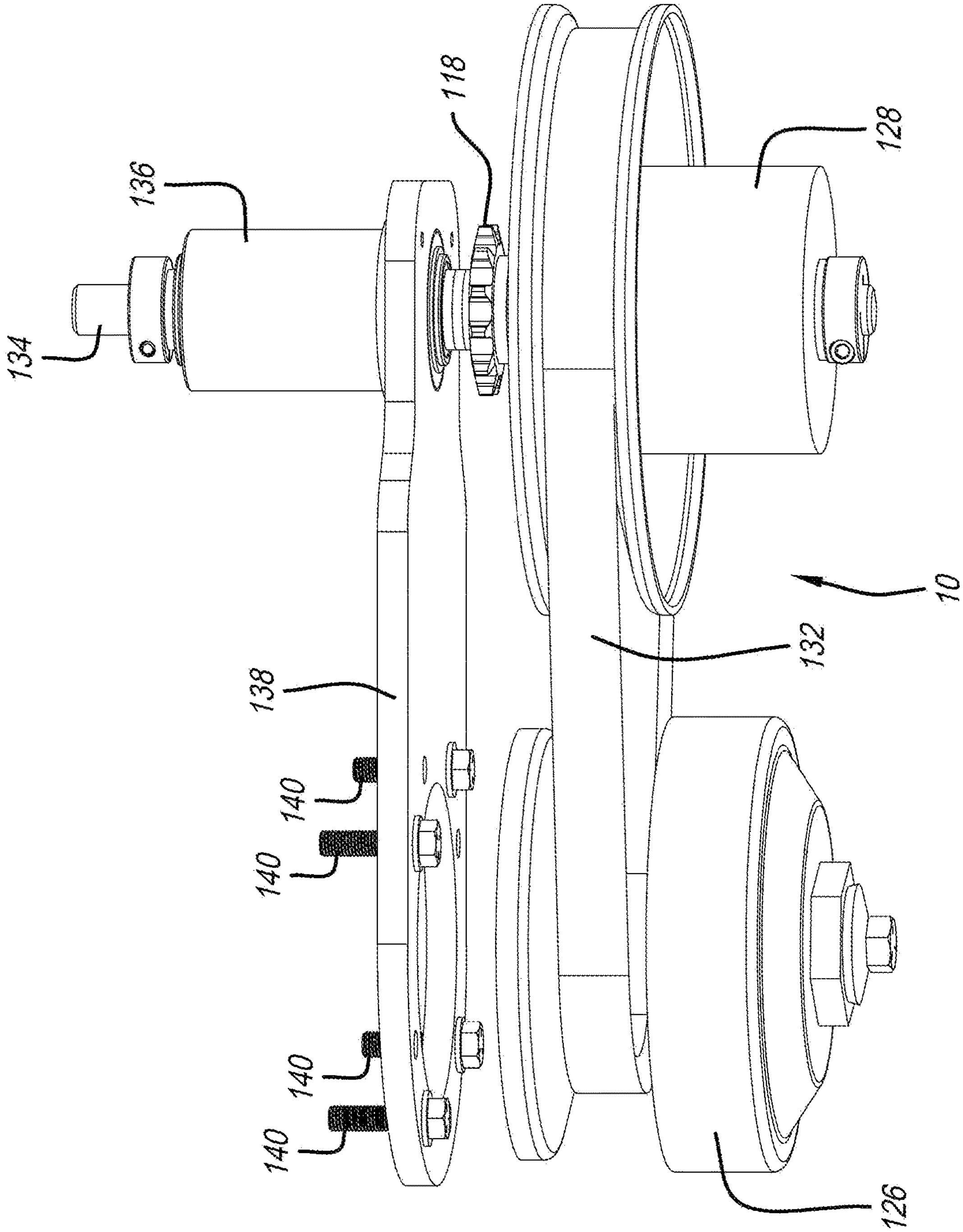
FIG. 19 is a top perspective view of the CVT of the log-splitting machine of FIG. 1.
Figure 20:
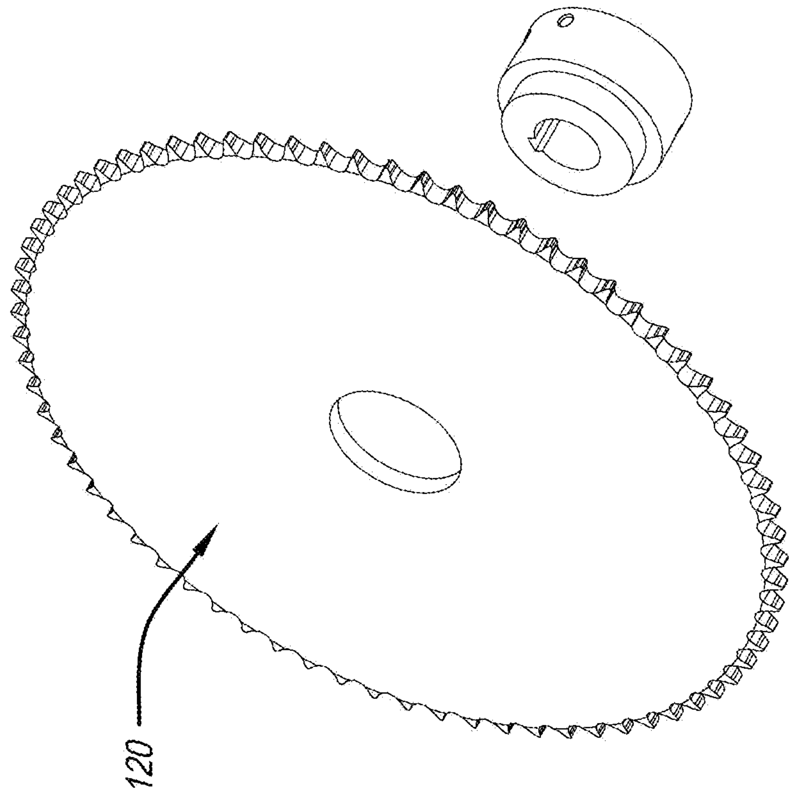
FIG. 20 is an exploded perspective view of the driven sprocket of the reduction gear set of the log-splitting machine of FIG. 1.
Figure 21:
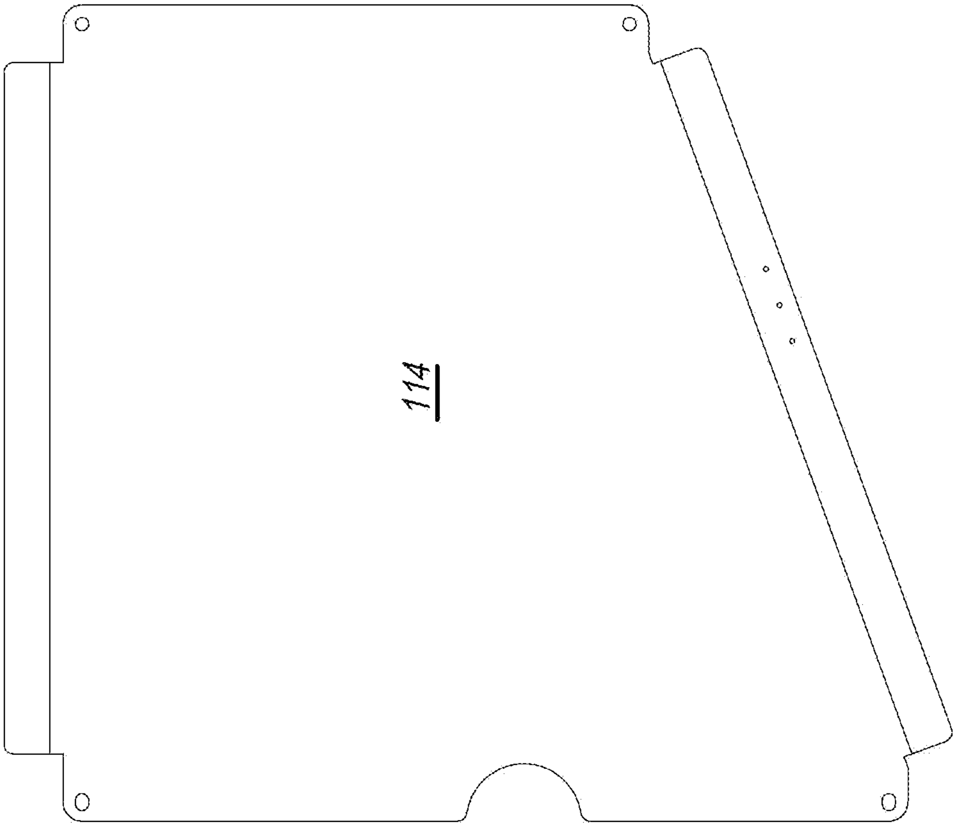
FIG. 21 is a perspective view of the guard panel of the log-splitting machine of FIG. 1.

Referring to FIGS. 17-19, the CVT includes a clutch drive unit 126 and a clutch driven unit 128. The drive unit 126 is mounted to the crankshaft 130 of the motor 110 so that the drive unit 126 rotates as the motor crankshaft 130 rotates. The CVT drive unit 126 is coupled to the CVT driven unit 128 by a drive belt 132. The CVT driven unit 128 is mounted to and drives a CVT output shaft or jackshaft 134, which is supported by and rotates within a bushing or bearing 136. The jackshaft bushing 136 is mounted to a CVT mounting plate 138, which is mounted to the motor 110 with mounting bolts 140. As can be seen in FIGS. 5-7 and 19-20, to further reduce the speed of the splitter screw 6, the CVT jackshaft 134 is coupled to the screw shaft 108 by a reduction gear set 115, which includes a drive sprocket 118 mounted to the jackshaft 134 and coupled by a chain 116 to a driven sprocket 120 that is mounted on the screw shaft 108.

In a presently preferred embodiment of the log splitter of the invention, the splitter screw rotation speed is approximately 380 rev/min, which requires approximately 11.7 horsepower to split most logs in a timely manner. Two motors that are suitable for providing such performance are the Honda GX390 engine and the Lifan 190F engine. Both engines produce usable torque in similar areas of their speed ranges: 2000 to 3600 rev/min. The CVT 10 is selected to appropriately match the engine specifications. The CVT provides a variable speed-reduction ratio within a specific ratio range. One suitable CVT for use with the log splitter of the present invention is the Model 40 Series Torque Converter sold by Comet Clutches, a division of Certified Parts Corporation, of Edgerton, Wisconsin, which can be configured to have a speed reduction ratio range of about 1:1 to 2.43:1. With this specific engine/CVT combination, to reliably split a desired range of log sizes requires further speed reduction, which can preferably be provided by a chain drive assembly 115 like that described above. Such a chain drive assembly can be utilized to reduce the splitter screw speed to a range of about 250 to 600 revolutions per minute, which provides a wide range of log-splitting capabilities.

Figure 12:
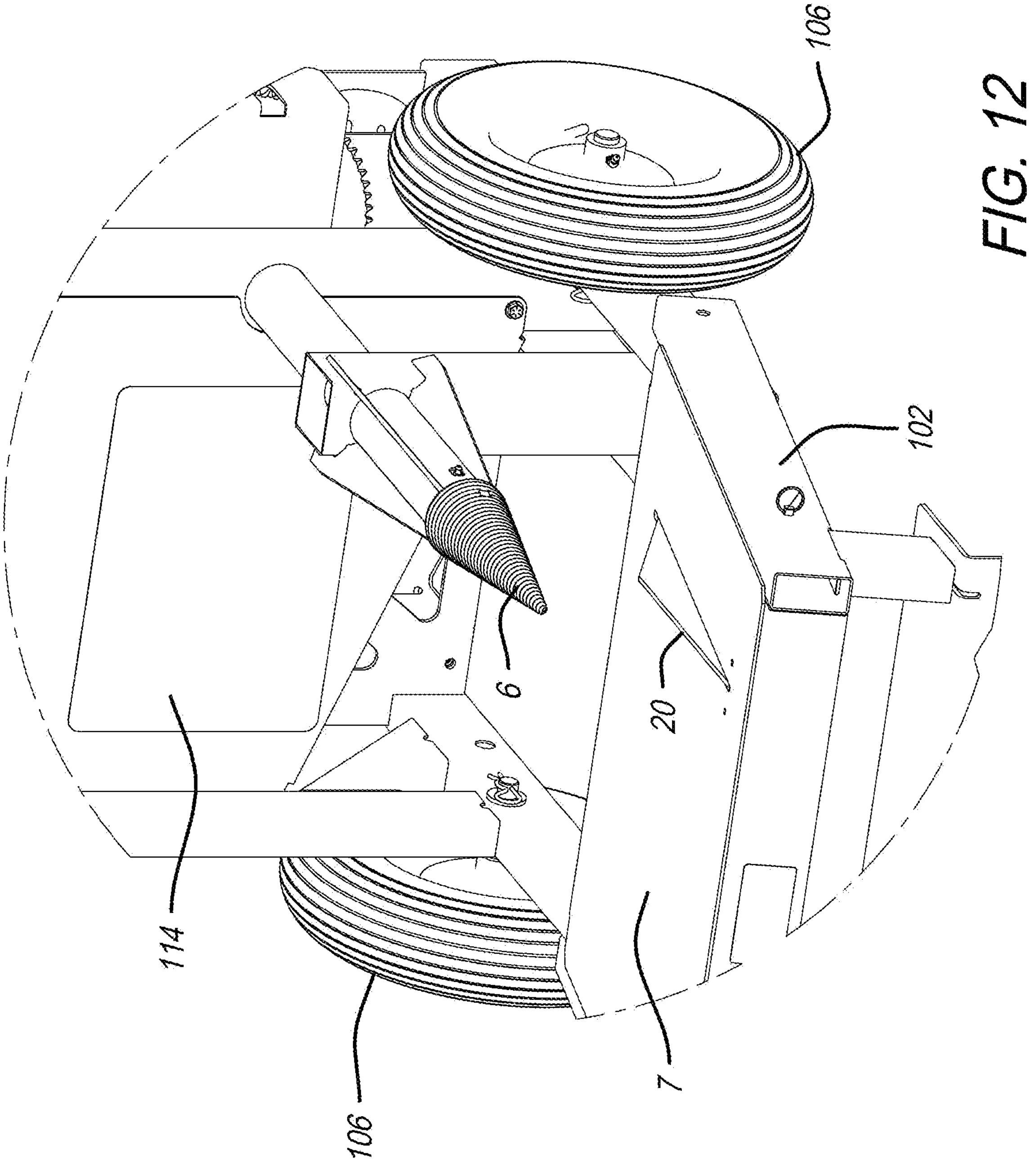
FIG. 12 is a top front perspective view of the log-splitting machine of FIG. 1 showing the stop plate of the log-rotation stop mechanism in an extended position protruding upward out of a slot in the support table when no weight is placed on the stop plate.
Figure 13:
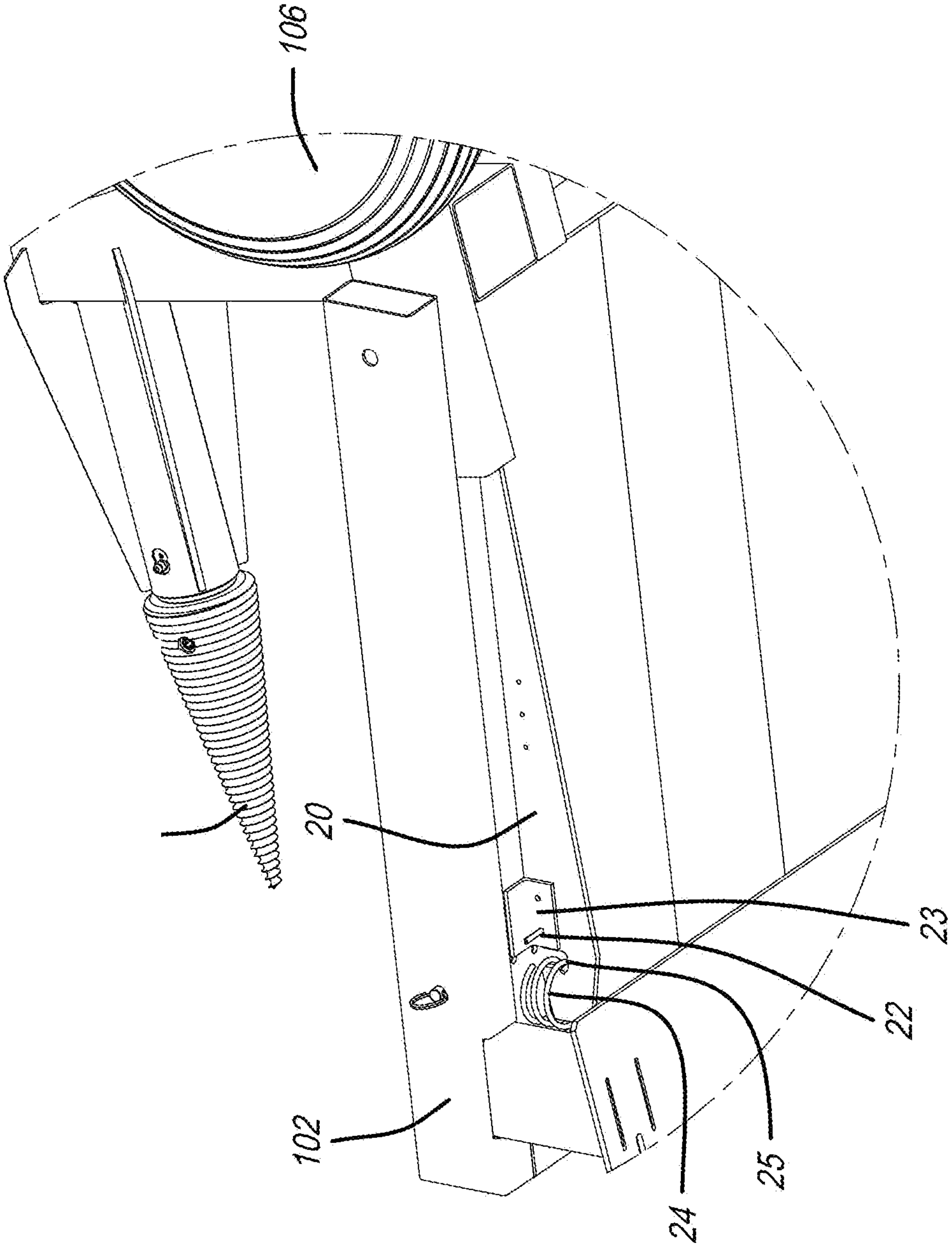
FIG. 13 is a bottom side perspective view of the log-splitting machine of FIG. 1 showing the stop plate of the log-rotation stop mechanism in an extended position protruding upward out of the table slot and above the support table when no weight is placed on top of the stop plate.
Figure 14:
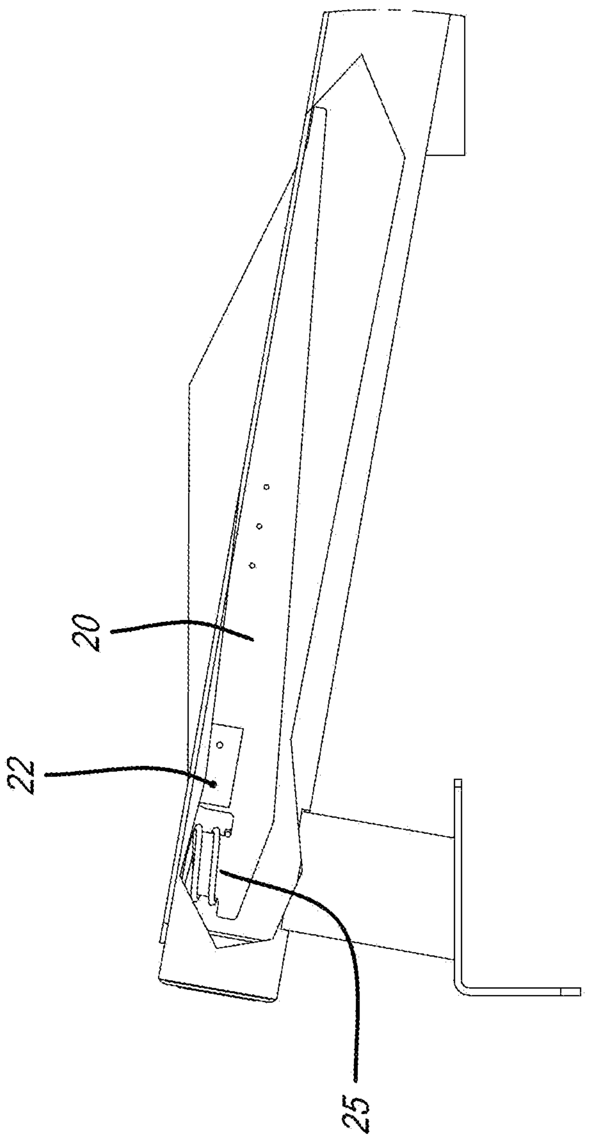
FIG. 14 is a side cutaway view showing the log-rotation stop mechanism of FIGS. 12 and 13 with the stop plate in the depressed position with weight (not shown) placed on top of the stop plate.

Referring to FIGS. 12-14, the log-rotation stop mechanism 4 of the log-splitting machine 100 is mounted to the chassis 102 and is configured so that, if a workpiece 11, 12 gets stuck on the splitter screw 6 as the splitter screw rotates, the log-rotation stop mechanism 4 will restrict rotation of the workpiece. The log-rotation stop mechanism 4 includes a stop plate or cleaver 20 that is pivotally supported by a bracket 23 mounted to the chassis 102 underneath the top of the support table 7. A mounting hole 21 in the stop plate 20 is sized to receive a stop plate pin 22, such as a cotter pin, which extends through the stop plate 20 and through corresponding holes in the bracket 23 to pivotally mount the stop plate 20 to the bracket 23. At a distal end of the stop plate 20, an upward projection 25 is formed for holding a compression spring 24 positioned between the support table 7 and the stop plate 20 so as to exert a downward force on the distal end of the stop plate 20. This force causes the opposing proximal portion of the stop plate 20 to rotate upward and protrude out of a slot 26 in the table 7, which slot can be seen in FIGS. 5 and 8. In this configuration, when no weight is placed on the top of the stop plate 20, it will protrude upward through the slot 26 and above the top of the support table 7 (see FIGS. 12 and 13). When sufficient weight, such as that of a log, is placed on top of the protruding stop plate 20, that weight will force the stop plate 20 downward through the slot 26 and compress the compression spring 24 (see FIG. 14). As the log is being split, if the log gets stuck on the rotating screw 6 it may rotate enough that its weight is lifted from the stop plate 20. In that event, the compression spring will cause stop plate 20 to pop up so that it projects above the table 7 and can contact the log to restrict it from further rotation.

Having read this disclosure, it will be understood by those having skill in the art that the log splitter of the present invention provides a number of advantages over the prior art. It has the advantage of using a rotating screw wedge but also is portable, efficient, relatively small and light, and includes an integrated drive assembly. It can be powered by a relatively small engine and still provide both high speed and high torque as required at various times during the process of splitting logs. It provides enhanced safety features, which can restrict a person from accidentally falling onto the splitter screw and can include an engine kill mechanism that is readily accessible and convenient to use. In addition, it can have a low working table height that can reduce user strain.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept.

What is claimed is:

1. A log splitter comprising:

a chassis having a support table configured to support a workpiece to be split;

a splitter screw having a generally conical shape, wherein the splitter screw is mounted to a screw shaft that is supported above the support table by the chassis, and wherein the screw shaft is rotatable about a screw axis; and a drive assembly configured to rotate the screw shaft to impart rotational movement to the splitter screw; and a fall restriction member disposed above at least a portion of the screw shaft;

wherein the drive assembly includes a motor coupled to the screw shaft via a constant velocity transmission; and wherein the fall restriction member is configured to restrict a person from falling onto the splitter screw.

2. The log splitter of claim 1, wherein the support table comprises a table top generally disposed in a table top plane that forms an acute angle with the screw axis.

3. The log splitter of claim 2 wherein the acute angle is approximately 10 degrees.

4. The log splitter of claim 1 wherein the support table comprises a table top generally disposed in a table top plane that is approximately nine inches above the bottom of a chassis support member.

5. The log splitter of claim 1 wherein the fall restriction member comprises a bar member mounted to the chassis and disposed generally laterally to the screw shaft.

6. The log splitter of claim 1 further comprising an engine kill member pivotally mounted to the chassis wherein when the engine kill member is pivoted downward or rearward it activates the engine kill switch.

7. The log splitter of claim 6 wherein the engine kill member comprises an elongated member disposed generally above and laterally to the splitter screw.

8. The log splitter of claim 2 wherein the support table and splitter screw are dimensioned and disposed so that clearance between the table top plane and a plane defined by a splitter screw lower surface increases from a screw distal end to a screw proximal end.

9. The log splitter of claim 1 further comprising a log-rotation stop mechanism coupled to the support table and configured so that, if a workpiece gets stuck on the splitter screw as the splitter screw rotates, the log-rotation stop mechanism will restrict rotation of the workpiece.

10. The log splitter of claim 9 wherein the log-rotation stop mechanism comprises a movable stop plate configured so that, if a workpiece gets stuck on the splitter screw as the splitter screw rotates, the stop plate will move to a position where it projects above the support table as the workpiece rotates.

11. The log splitter of claim 1 wherein the drive assembly further comprises a reduction gear set that couples the constant velocity transmission to the screw shaft.

12. The log splitter of claim 11 wherein the reduction gear set comprises a drive sprocket mounted to an output shaft of the constant velocity transmission, a driven sprocket mounted to the screw shaft, and a drive chain that couples the drive sprocket to the driven sprocket.

13. The log splitter of claim 1 wherein the drive assembly is configured to rotate the screw shaft at a rotational velocity in a range from equal to or greater than 250 revolutions per minute to equal to or less than 600 revolutions per minute.

14. A log splitter comprising:

a chassis having a support table configured to support a workpiece to be split;

a splitter screw having a generally conical shape, wherein the splitter screw is mounted to a screw shaft that is supported above the support table by the chassis, and wherein the screw shaft is rotatable about a screw axis;

a drive assembly configured to rotate the screw shaft to impart rotational movement to the splitter screw; and a fall restriction member disposed above at least a portion of the screw shaft;

wherein the fall restriction member is configured to restrict a person from falling onto the splitter screw; and wherein the support table comprises a table top generally disposed in a table top plane that forms an acute angle with the screw axis.

15. The log splitter of claim 14 wherein the acute angle is approximately 10 degrees.

16. The log splitter of claim 14 wherein clearance between the table top plane and a plane defined by a splitter screw lower surface increases from a screw distal end to a screw proximal end.

17. The log splitter of claim 14 further comprising a log-rotation stop mechanism coupled to the support table and configured so that, if a workpiece gets stuck on the splitter screw as the splitter screw rotates, the log-rotation stop member can restrict rotation of the workpiece.

18. The log splitter of claim 17 wherein the log-rotation stop mechanism comprises a movable stop plate configured so that, if a workpiece gets stuck on the splitter screw as the splitter screw rotates, the stop plate will move to a position where it projects above the support table as the workpiece rotates.

* * * * *